(12) United States Patent
Nielsen et al.

(10) Patent No.: US 9,458,828 B2
(45) Date of Patent: Oct. 4, 2016

(54) CONTROLLING WIND POWER PLANT WITH NEGATIVE POWER CAPABILITY TO RESPOND TO GRID FREQUENCY INSTABILITY

(71) Applicants: Kaj Skov Nielsen, Issaquah, WA (US);
Robert J. Nelson, Orlando, FL (US);
Hongtao Ma, Orlando, FL (US)

(72) Inventors: Kaj Skov Nielsen, Issaquah, WA (US);
Robert J. Nelson, Orlando, FL (US);
Hongtao Ma, Orlando, FL (US)

(73) Assignee: Siemens Aktiengesellschaft, Munich (DE)

( * ) Notice: Subject to any disclaimer, the term of this patent is extended or adjusted under 35 U.S.C. 154(b) by 387 days.

(21) Appl. No.: 14/100,112

(22) Filed: Dec. 9, 2013

(65) Prior Publication Data

US 2015/0159627 A1  Jun. 11, 2015

(51) Int. Cl.
| | | |
|---|---|---|
| F03D 7/02 | (2006.01) | |
| F03D 7/06 | (2006.01) | |
| F03D 7/04 | (2006.01) | |
| H02J 3/24 | (2006.01) | |
| H02J 3/38 | (2006.01) | |

(52) U.S. Cl.
CPC ............. *F03D 7/0284* (2013.01); *F03D 7/042* (2013.01); *F03D 7/048* (2013.01); *F03D 7/06* (2013.01); *H02J 3/24* (2013.01); *H02J 3/386* (2013.01); *F03D 9/10* (2016.05); *F05B 2270/1033* (2013.01); *F05B 2270/335* (2013.01); *F05B 2270/337* (2013.01); *Y02E 10/723* (2013.01); *Y02E 10/763* (2013.01); *Y02E 10/766* (2013.01)

(58) Field of Classification Search
CPC ........ F03D 7/00; F03D 7/0284; F03D 7/042; F03D 7/048; F03D 9/003; F03D 9/005; F03D 9/02; F03D 9/021; F05B 2270/335; F05B 2270/337; F05B 2270/1033; F05B 2270/1041; F05B 2240/96; Y02E 10/763; Y02E 10/723; Y02E 70/766; Y02E 70/30; H02J 3/386; H02J 3/24; H02J 15/00; G05B 15/02; G05F 1/66
See application file for complete search history.

(56) References Cited

U.S. PATENT DOCUMENTS

| | | | |
|---|---|---|---|
| 7,504,738 B2 * | 3/2009 | Barton | F03D 7/0284 290/40 R |
| 8,046,110 B2 | 10/2011 | Mayor | |
| 8,704,392 B2 * | 4/2014 | Bager | F03D 7/0284 290/44 |
| 8,946,916 B2 * | 2/2015 | Tarnowski | F03D 7/0276 290/44 |
| 9,222,466 B2 * | 12/2015 | Tarnowski | F03D 7/0284 |
| 2010/0276931 A1 | 11/2010 | Wobben | |
| 2012/0139241 A1 | 6/2012 | Haj-Maharsi | |

(Continued)

FOREIGN PATENT DOCUMENTS

| | | |
|---|---|---|
| EP | 2224129 A2 | 9/2010 |
| EP | 2393179 A2 | 12/2011 |

(Continued)

*Primary Examiner* — Crystal J Barnes-Bullock
(74) *Attorney, Agent, or Firm* — Beusse Wolter Sanks & Maire

(57) ABSTRACT

A method of controlling a wind power plant, the wind power plant having a plurality of wind turbines and being connected to a power grid is provided. The method includes (a) detecting a grid frequency instability, (b) selecting a subset of wind turbines, (c) modifying a power reference for each wind turbine in the selected subset of wind turbines to respond to the grid frequency instability, and (d) applying the modified power references to the corresponding wind turbines in the selected subset of wind turbines. A wind power plant controller, a wind power plant, a computer program, and a computer program product are also provided.

16 Claims, 2 Drawing Sheets

(56) References Cited

U.S. PATENT DOCUMENTS

| | | | |
|---|---|---|---|
| 2013/0221671 A1 | 8/2013 | Yasugi | |
| 2014/0316592 A1* | 10/2014 | Haj-Maharsi | F03D 7/0284 700/287 |
| 2015/0022007 A1* | 1/2015 | Ma | H02J 3/386 307/84 |
| 2015/0105923 A1* | 4/2015 | Beekmann | H02J 3/24 700/287 |
| 2015/0120070 A1* | 4/2015 | Tarnowski | H02J 3/386 700/287 |

FOREIGN PATENT DOCUMENTS

| | | |
|---|---|---|
| WO | 2013110327 A1 | 8/2013 |
| WO | 2013167141 A1 | 11/2013 |

\* cited by examiner

CONTROLLING WIND POWER PLANT WITH NEGATIVE POWER CAPABILITY TO RESPOND TO GRID FREQUENCY INSTABILITY

FIELD OF INVENTION

The present invention relates to the field of controlling wind turbines in a wind power plant, in particular to a method of controlling a wind power plant to respond to grid frequency instability. The present invention further relates to a wind power plant controller, a wind power plant, a computer program and a computer program product.

ART BACKGROUND

Power grid operators are confronted with the problem of maintaining frequency stability. With the increasing penetration of wind power in many regions, it would be desirable for grid operators if wind power plants (also referred to as wind parks) were able to contribute with frequency response in order to maintain frequency stability. Due to the varying wind conditions at a wind power plant, the wind power plants ability to provide frequency response, e.g. by reducing production of active power, also varies.

Accordingly, there is a need for a wind power plant to be able to provide frequency response independently of wind conditions.

SUMMARY OF THE INVENTION

This need may be met by the subject matter according to the independent claims. Advantageous embodiments of the present invention are described by the dependent claims.

According to a first aspect of the invention there is provided a method of controlling a wind power plant, the wind power plant comprising a plurality of wind turbines and being connected to a power grid. The method comprises (a) detecting a grid frequency instability, (b) selecting a subset of wind turbines, (c) modifying a power reference for each wind turbine in the selected subset of wind turbines to respond to the grid frequency instability, and (d) applying the modified power references to the corresponding wind turbines in the selected subset of wind turbines.

This aspect of the invention is based on the idea that frequency response is provided by modifying the power references for a selected subset of wind turbines in the wind power plant.

In the present context, the term "subset of wind turbines" may in particular denote a set comprising any number of the wind turbines in the wind power plant, in particular a single wind turbine, some of the wind turbines or all wind turbines in the wind power plant. In other words, if the wind power plant contains N wind turbines, the "subset of wind turbines" may include 1, 2, 3, . . . , N–1, or N wind turbines.

In the present context, the term "power reference" may in particular denote a set point for a given wind turbine indicating the amount of active power it is supposed to produce.

In operation, a grid frequency instability incidence is detected, and a subset of wind turbines is selected. In particular, the selection of the subset of wind turbines may take one or more parameters into consideration, such as the kind of frequency instability (e.g., over frequency situation, under frequency situation), significance of the instability (e.g., deviation from a predetermined target frequency), and current operating conditions for the wind turbines. Thereby, it can be assured that the selected subset of wind turbines contains enough and suitable wind turbines for providing a desired response.

Then, a power reference for each wind turbine in the selected subset of wind turbines is modified to provide a response to the grid frequency instability. In particular, the power references may be adjusted in order to change the amount of active power that is produced by the wind power plant. Finally, the modified power references are applied to the corresponding wind turbines in the selected subset of wind turbines. In particular, the modified power references may be transmitted from a central control unit, such as a High Performance Park Pilot, to each of the selected wind turbines, e.g. through a data network in the wind power plant.

Thereby, a proper response to a grid frequency instability incident can be provided by the selected subset of wind turbines in the wind power plant.

According to an embodiment of the invention, the detected frequency instability is an over frequency situation, and modifying the power reference for each wind turbine in the selected subset of wind turbines comprises reducing the power reference for each wind turbine in the selected subset of wind turbines.

In the present context, the term "over frequency situation" may in particular denote a situation where the power grid frequency exceeds an upper limit of an allowed range for the grid frequency. For example, a 50 Hz grid may be allowed to fluctuate within a range between 49.5 Hz and 50.5 Hz. In this case, an over frequency situation occurs when the grid frequency exceeds 50.5 Hz.

By reducing the power references for the selected wind turbines, the total production of active power is reduced such that the grid frequency is reduced.

According to a further embodiment of the invention, a first wind turbine in the selected subset of wind turbines is producing active power when the grid frequency instability is detected.

By reducing the power reference for a wind turbine that produces active power, the produced amount of active power can be rapidly reduced in a simple manner. In particular, if the first wind turbine is operating at nominal power, e.g., at 3.0 MW, a significant reduction in the produced amount of active power can be achieved by reducing the corresponding power reference.

According to a further embodiment of the invention, a second wind turbine in the selected subset of wind turbines is idling or standing still when the grid frequency instability is detected, and wherein the power reference for the second wind turbine is reduced to a negative value.

By applying a negative power reference to a wind turbine that produces no or only an insignificant amount of active power, the wind turbine will act as a load consuming active power. Thereby, the total production of active power is correspondingly reduced or, in case of no wind, active power is absorbed from the grid. In both cases, the second wind turbine contributes to a reduction of the grid frequency.

According to a further embodiment of the invention, reducing the power reference for each wind turbine in the selected subset of wind turbines is limited by a protective limit value.

In the present context, the term "protective limit value" may in particular denote a maximum amount of change that is allowed to be applied to the power reference for a wind turbine.

By limiting the reduction of the power reference by the protective limit value, the wind turbine is protected against dangerously large impacts due to significant changes of the power reference. In particular, it can be avoided that a wind turbine operating at nominal power, e.g., 3.0 MW, is suddenly controlled to change to a negative minimum power, e.g., −1.8 MW. Such a change would cause enormous mechanical loads on the rotor, gears etc. of the turbine and could even cause instant destruction of such parts.

According to a further embodiment of the invention, the method further comprises (a) selecting a further subset of wind turbines, and (b) increasing internal power consumption in each wind turbine in the selected further subset of wind turbines by modifying state signals for each wind turbine in the selected further subset of wind turbines.

The further subset of wind turbines may be different from or equal to the selected subset of wind turbines.

By increasing the internal power consumption in each wind turbine in the selected further subset, a further contribution to reducing the overall production of active power or to absorbing active power from the grid can be provided, and thereby a corresponding further contribution to reducing the grid frequency.

According to a further embodiment of the invention, increasing internal power consumption in each wind turbine in the selected further subset of wind turbines comprises increasing heating or cooling in each wind turbine in the selected further subset of wind turbine.

By increasing heating or cooling (depending on the outside temperature conditions at the wind power plant site) in the wind turbines, a rapid additional consumption of active power can be provided in an easy manner, at least for a limited amount of time.

According to a further embodiment of the invention, the detected frequency instability is an under frequency situation, and modifying the power reference for each wind turbine in the selected subset of wind turbines comprises increasing the power reference for each wind turbine in the selected subset of wind turbines.

In the present context, the term "under frequency situation" may in particular denote a situation where the power grid frequency exceeds a lower limit of an allowed range for the grid frequency. For example, a 50 Hz grid may be allowed to fluctuate within a range between 49.5 Hz and 50.5 Hz. In this case, an under frequency situation occurs when the grid frequency goes below 49.5 Hz.

By increasing the power references for the selected wind turbines, the total production of active power is increased such that the grid frequency is correspondingly increased.

According to a further embodiment of the invention, selecting a subset of wind turbines is based on lifetime consumption and/or load considerations for each wind turbine in the wind power plant.

For example, wind turbines with a high expected lifetime compared to other wind turbines in the wind power plant may be selected in order to avoid that wind turbines with a relatively low expected life time, e.g. due to their position within the wind power plant, are exposed to the additional load and wear caused by the frequency response functions, in particular the application of negative power references.

According to a second aspect of the invention there is provided a wind power plant controller comprising a processing unit adapted to perform the method according to the first aspect or any of the above embodiments.

This aspect of the invention is based on substantially the same idea as the first aspect described above.

In particular, the wind power plant controller may be a High Performance Park Pilot (HPPP) which is modified with software and/or hardware, such that it is capable of performing the method according to first aspect or any of the above embodiments thereof. The implementation may also require modifications of the sub-systems like the turbine interface or turbine controller or even the mechanical system in order to accept the control commands issued by the HPPP.

According to a third aspect of the invention there is provided a wind power plant. The wind power plant comprises (a) a plurality of wind turbines, and (b) a wind power plant controller according to the second aspect.

The wind turbines are designed to be able to respond to negative power references, i.e. the mechanical elements are designed to allow a mode of operation that consumes active power from the grid, e.g., by rotating the turbine as a motor—either in the normal direction of operation or in the opposite direction. In particular, each turbine controller is designed to receive negative power reference and to regulate operation of the turbine accordingly.

According to a further embodiment, the wind power plant further comprises an energy storage for providing additional active power to the grid in case of an under frequency situation.

The additional energy storage is particularly useful in situations where the wind power plant is operating at full or close to full power production and is thus not able to significantly increase its production of active power in order to respond to an under frequency situation. Furthermore, in situations where there is no wind, the storage may be used to recharge during high frequency events, essentially consuming power and thus reducing the amount of negative power requirements on the turbines in order to achieve the desired aggregate response.

According to a further embodiment, each wind turbine of the plurality of wind turbines comprises an internal wind turbine controller adapted to perform at least a part of the method of controlling the wind power plant.

In this embodiment, a part of the control system is distributed to the wind turbines. A distributed control system provides improved robustness in case of a failure in a central controller.

According to a fourth aspect of the invention, there is provided a computer program for a wind power plant controller, the computer program comprising computer executable instructions adapted to, when executed by a computer processor, perform the method according to the first aspect or any of the above embodiments thereof.

According to a fifth aspect of the invention, there is provided a computer program product comprising a computer readable data carrier loaded with a computer program according to the fourth aspect.

It is noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular to combinations of features of the method type claims and features of the apparatus type claims, is part of the disclosure of this document.

The aspects defined above and further aspects of the present invention are apparent from the examples of embodiments to be described hereinafter and are explained with reference to the examples of embodiments. The invention will be described in more detail hereinafter with reference to examples of embodiments. However, it is explicitly noted that the invention is not limited to the described exemplary embodiments.

DETAILED DESCRIPTION

Figure 1:
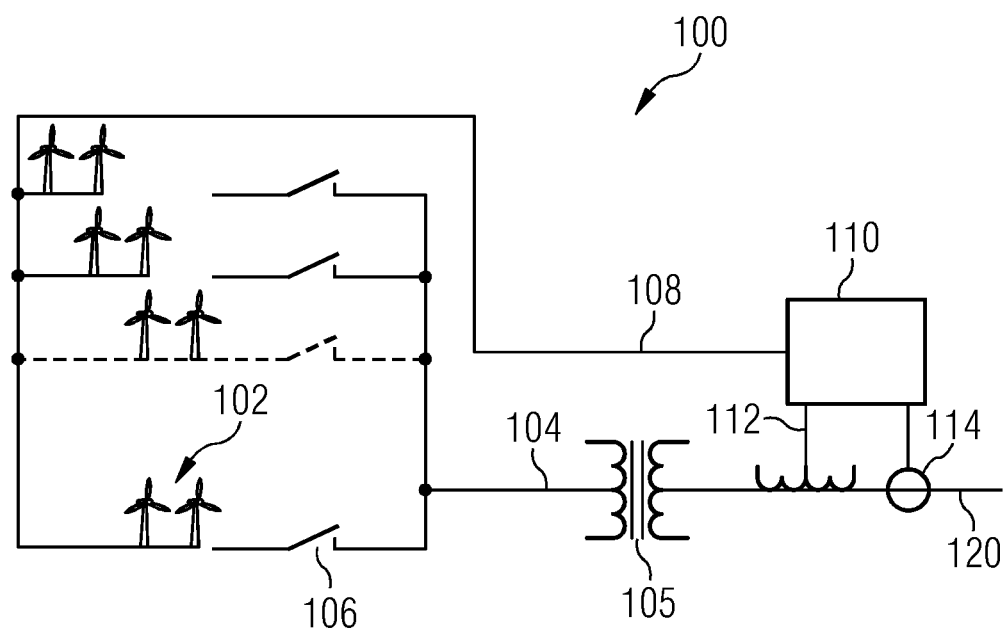
FIG. 1 shows a wind power plant connected to a power grid in accordance with an embodiment.

The illustration in the drawing is schematic. It is noted that in different figures, unless specifically indicated otherwise, similar or identical elements are provided with the same reference numerals or with reference numerals which differ only within the first digit.

FIG. 1 shows a wind power plant 100 connected to a power grid 120 in accordance with an embodiment. The wind power plant 100 comprises a plurality of wind turbines 102 arranged in rows, wherein each row is connected a park grid 104 through a switch 106. The park grid 104 is coupled to the external power grid 120 through transformer 105. The wind power plant 100 further comprises a park controller (High Performance Park Pilot, HPPP) 110 which is in data communication with each wind turbine via park data network 108. The park controller 110 is connected to various sensor units 112, 114 for measuring relevant parameters on the power grid 120, such as grid frequency and voltage. The park controller 110 is further connected to various sensors (not shown) within the park grid 104 for measuring relevant internal parameters of the wind power plant 100 during operation. The park controller 110 serves, to control operation of the wind power plant 100 as it is known in the art, in particular to control each single wind turbine 102 by transmitting corresponding control signals and messages and receiving responses from the wind turbines via the park data network 108.

Furthermore, in accordance with the embodiment, the park controller 110 is adapted to detect grid frequency instabilities via sensor units 112, 114, i.e. situations where the grid frequency is above or below corresponding maximum or minimum frequency limits. In case of an under frequency situation, the park controller 110 will initiate a frequency response by increasing production of active power in the wind power plant 100, i.e. by increasing the power reference(s) for one or more of the wind turbines 102, if possible. Once the grid frequency returns to the allowed range of variation, the increased power references may be decreased again.

In case of an over frequency situation, the park controller 110 acts as follows: As a first step, it determines whether the wind power plant is currently producing active power. If this is the case, it modifies the power references for a selection of the producing wind turbines 102 by decreasing these power references with a predetermined amount in order to decrease the overall production of active power and thereby assist the grid 120 in reducing the frequency. The predetermined amount has a limited size in order to avoid potentially damaging mechanical loads on the turbines. If a large reduction in active power is needed, the power references may be reduced stepwise over time and in the end be negative, causing the wind turbines 102 to consume energy, e.g. by rotating as motors. However, as it is preferable to provide a rapid response, internal power consumption in the wind turbines 102 may also be temporarily increased, e.g. by increasing the power consumed by cooling or heating systems in the wind 102. Internal consumption in the wind turbine will be seen as power output reduction from the grid interconnection point.

Furthermore, to further increase the frequency response of the wind power plant 100 or to provide a frequency response in a situation where there is no wind and thus no production of active power at the wind power plant site, negative power references may be transmitted to a selection of wind turbines 102 that are idling (i.e. rotating very slowly) or standing still. The negative power references are limited to avoid excessive mechanical load on the wind turbines 102 or dynamic oscillations when changing the direction of power flow. Furthermore, when selecting the wind turbines 102 that are to receive negative power references, lifetime consumption considerations may be taken into account, such that wind turbines 102 having high remaining expected lifetime compared to other wind turbines 102 of the wind power plant 100 are first selected for receiving the negative power references. Thereby, it can be assured that wind turbines 102 with relatively short remaining lifetime expectations are not or less exposed to the additional wear associated with the application of negative power references. The wind turbine operational mode associated with a negative power reference may or may not reverse the actual rotation of the wind turbine rotor.

The above described actions for responding to an over frequency situation may be performed in several steps over time. Thereby, the park controller 110 is capable of controlling the frequency response of the individual wind turbines 102 to modulate the aggregate response at the point of measurement in order to respond proportionally to the frequency increase until the point of interconnection (between wind power plant 100 and grid 120) reaches a design energy import specified for the local interconnection requirements.

Figure 2:
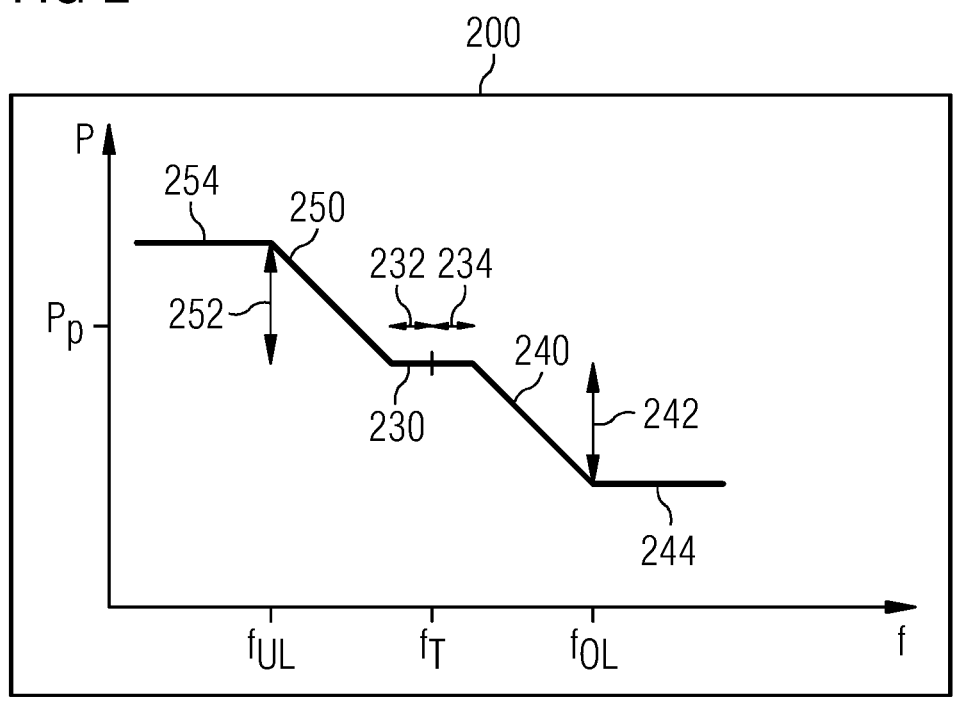
FIG. 2 shows a wind power plant frequency response in positive power domain according to a comparative example.

FIG. 2 shows a wind power plant frequency response 200 in positive power domain according to a comparative example, which does not allow negative power references to individual wind turbines. The nominal production power of the wind power plant is indicated as $P_p$ on the vertical power axis. The target grid frequency is indicated as $f_T$ on the horizontal frequency axis. Around this target frequency $f_T$, as indicated by the flat curve section 230, no action is taken as long as the grid frequency stays within the allowed under deviation range 232 and allowed over deviation range 234.

If an over frequency situation occurs, i.e. if the frequency exceeds the maximum frequency of the range 234, the power production is ramped down as indicated by the sloped curve section 240 for frequencies below the over limit frequency indicated as $f_{OL}$. Above $f_{OL}$, the maximum power reduction 242 is applied as indicated by the flat curve section 244.

In an embodiment for frequency response in a different geographic region, the response curve may have more or fewer steps in the response curves or different slopes at different frequency levels or any other function that the grid operator deems optimal for the local grid conditions.

Similarly, in case of an under frequency situation, i.e. if the frequency is below the minimum frequency of the range 232, the power production is increased as indicated by the sloped curve section 250 until a maximum power increase 252 is reached at the under limit frequency $f_{UL}$. For frequencies smaller than $f_{UL}$, the maximum power increase 252 is applied as indicated by the flat curve section 254. A steady state increase in power as a response to an under frequency requires that the wind power plant contains energy storage or that the wind power plant was operated in a reduced power mode prior to the under frequency occurrence.

As can be seen from the above, the wind power plant will in this case not be able to provide a response to an over frequency situation in cases where there is no wind at the wind power plant site and thus no production of active power in the wind power plant.

Figure 3:
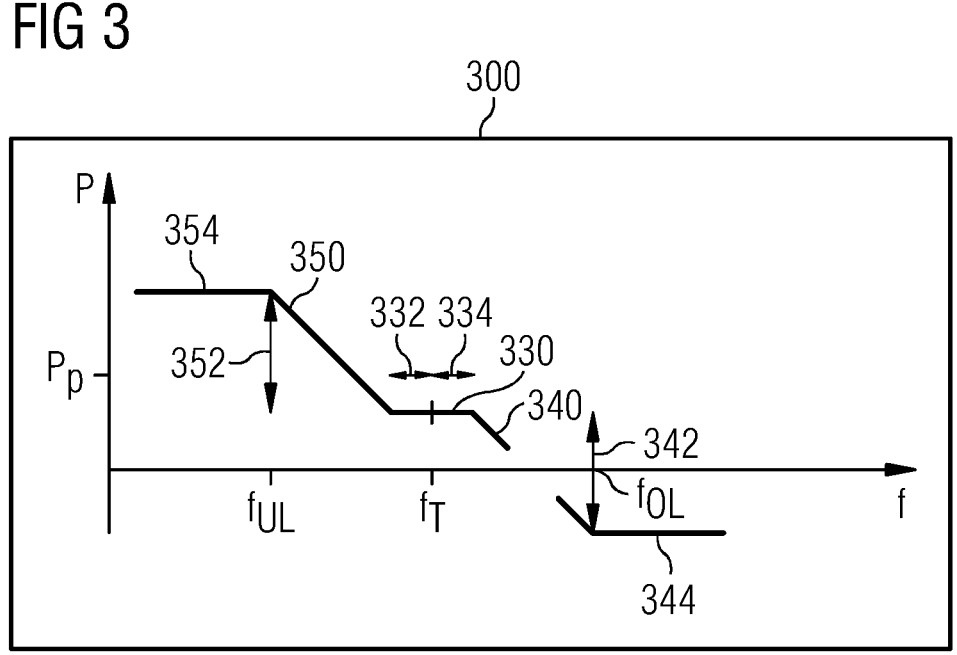
FIG. 3 shows a wind power plant frequency response in positive and negative power domain according to an embodiment.

FIG. 3 shows a wind power plant frequency response 300 in positive and negative power domain according to an embodiment. The frequency response 300 is similar to the frequency response 200 of the comparative example discussed above, but differs from this in one significant aspect. That is, by applying negative power references to a selection of wind turbines in the wind power plant, the overall power production of the wind power plant can be negative, such that the wind power plant acts as a load consuming active power from the grid. More specifically, as indicated by the sloped curve section 340, in case of an over frequency situation, the "produced" power crosses to the negative side of the frequency axis.

Thereby, the range of possible response to an over frequency situation is significantly increased in comparison to the comparative response 200 and the wind power plant is even capable of providing a response to an over frequency in situations where there is no wind at the wind power plant site.

The characteristics of the frequency response may be defined with unique curves for operation with active power versus for operation during no wind conditions. There may be grid operator imposed restrictions on the magnitude of power import related to frequency response. The ancillary service frequency response compared to other ancillary services may be prioritized differently depending on whether the wind power plant is producing power or responding during no wind conditions.

In one embodiment, the implementation of the frequency response may be at a central controller issuing commands or references to a subset of turbines. However, the implementation of the frequency response controller may also be distributed to individual turbines. Finally, a combination of the two aforementioned implementations may be utilized, i.e. an implementation having a central part and a distributed part located at individual turbine controllers.

The implementation of the trigger function for the frequency response can be as a state command or as a numeric reference value or any combination of both types of signals.

It is noted that the term "comprising" does not exclude other elements or steps and the use of the articles "a" or "an" does not exclude a plurality. Also elements described in association with different embodiments may be combined. It is further noted that reference signs in the claims are not to be construed as limiting the scope of the claims.

The invention claimed is:

1. A method of controlling a wind power plant, the wind power plant comprising a plurality of wind turbines and being connected to a power grid, the method comprising
   detecting a grid frequency instability,
   selecting a subset of wind turbines,
   modifying a power reference for each wind turbine in the selected subset of wind turbines to respond to the grid frequency instability, and
   applying the modified power references to the corresponding wind turbines in the selected subset of wind turbines,
   wherein the detected frequency instability is an over frequency situation, and wherein modifying the power reference for each wind turbine in the selected subset of wind turbines comprises reducing the power reference for each wind turbine in the selected subset of wind turbines; and
   wherein a second wind turbine in the selected subset of wind turbines is idling or standing still when the grid frequency instability is detected, and wherein the power reference for the second wind turbine is reduced to a negative value.

2. The method according to the claim 1, wherein a first wind turbine in the selected subset of wind turbines is producing active power when the grid frequency instability is detected.

3. The method according to claim 1, wherein reducing the power reference for each wind turbine in the selected subset of wind turbines is limited by a protective limit value.

4. The method according to claim 1, further comprising
   selecting a further subset of wind turbines, and
   increasing internal power consumption in each wind turbine in the selected further subset of wind turbines by modifying state signals for each wind turbine in the selected further subset of wind turbines.

5. The method according to claim 4, further comprising
   increasing internal power consumption in each wind turbine in the selected further subset of wind turbines by increasing heating or cooling in each wind turbine in the selected further subset of wind turbine.

6. The method according to claim 1, wherein selecting a subset of wind turbines is based on lifetime consumption and/or load considerations for each wind turbine in the wind power plant.

7. A wind power plant controller comprising a processing unit to perform a method comprising:
   detecting a grid frequency instability,
   selecting a subset of wind turbines from a plurality of wind turbines,
   modifying a power reference for each wind turbine in the selected subset of wind turbines to respond to the grid frequency instability, and
   applying the modified power references to the corresponding wind turbines in the selected subset of wind turbines,
   wherein the detected frequency instability is an over frequency situation, and wherein modifying the power reference for each wind turbine in the selected subset of wind turbines comprises reducing the power reference for each wind turbine in the selected subset of wind turbines; and
   wherein a second wind turbine in the selected subset of wind turbines is idling or standing still when the grid frequency instability is detected, and wherein the power reference for the second wind turbine is reduced to a negative value.

8. A wind power plant comprising a plurality of wind turbines, and a wind power plant controller according to claim 7.

9. The wind power plant according to claim 8, further comprising an energy storage for providing additional active power to the grid in case of an under frequency situation.

10. The wind power plant according to claim 8, wherein each wind turbine of the plurality of wind turbines comprises an internal wind turbine controller adapted to perform at least a part of the control functions for the wind power plant.

11. The wind power plant controller according to claim 7, wherein reducing the power reference for each wind turbine in the selected subset of wind turbines is limited by a protective limit value.

12. The wind power plant controller according to claim 7, wherein selecting a subset of wind turbines is based on lifetime consumption and/or load considerations for each wind turbine in the wind power plant.

13. A computer program product comprising a non-transitory computer readable data carrier loaded with a computer program comprising computer executable instructions adapted to, when executed by a computer processor, perform a method comprising:
- detecting a grid frequency instability,
- selecting a subset of wind turbines,
- modifying a power reference for each wind turbine in the selected subset of wind turbines to respond to the grid frequency instability, and
- applying the modified power references to the corresponding wind turbines in the selected subset of wind turbines,
- wherein the detected frequency instability is an over frequency situation, and wherein modifying the power reference for each wind turbine in the selected subset of wind turbines comprises reducing the power reference for each wind turbine in the selected subset of wind turbines; and
- wherein a second wind turbine in the selected subset of wind turbines is idling or standing still when the grid frequency instability is detected, and wherein the power reference for the second wind turbine is reduced to a negative value.

14. The computer program product according to claim 13, wherein reducing the power reference for each wind turbine in the selected subset of wind turbines is limited by a protective limit value.

15. The computer program product according to claim 13, wherein selecting a subset of wind turbines is based on lifetime consumption and/or load considerations for each wind turbine in the wind power plant.

16. The computer program product according to claim 13, wherein the computer program is for a wind power plant controller.

* * * * *